US011310958B2

(12) United States Patent
Solimar Walter

(10) Patent No.: US 11,310,958 B2
(45) Date of Patent: Apr. 26, 2022

(54) SICKLE GUARD COUNTER-KNIFE INSERT

(71) Applicant: AGCO DO BRASIL SA LTDA, Ribeireo Preto (BR)

(72) Inventor: Airton Solimar Walter, Nova Sant Rita (BR)

(73) Assignee: AGCO do Brasil Soluções Agrìcolas Ltda., Ribeirao Preto (BR)

( * ) Notice: Subject to any disclaimer, the term of this patent is extended or adjusted under 35 U.S.C. 154(b) by 258 days.

(21) Appl. No.: 16/642,110

(22) PCT Filed: Aug. 24, 2018

(86) PCT No.: PCT/IB2018/056428
§ 371 (c)(1),
(2) Date: Feb. 26, 2020

(87) PCT Pub. No.: WO2019/048973
PCT Pub. Date: Mar. 14, 2019

(65) Prior Publication Data
US 2020/0352092 A1    Nov. 12, 2020

(30) Foreign Application Priority Data

Sep. 5, 2017 (GB) ..................................... 1714192

(51) Int. Cl.
*A01D 34/18* (2006.01)
*A01D 34/14* (2006.01)

(52) U.S. Cl.
CPC ............. *A01D 34/18* (2013.01); *A01D 34/14* (2013.01)

(58) Field of Classification Search
CPC ................................ A01D 34/14; A01D 34/18
See application file for complete search history.

(56) References Cited

U.S. PATENT DOCUMENTS

| 9,675 | A | * | 4/1853 | Manny | .................. | A01D 34/18 |
| | | | | | | 56/310 |
| 13,433 | A | * | 8/1855 | Morrison | ............... | A01D 34/18 |
| | | | | | | 56/307 |
| 15,334 | A | * | 7/1856 | Glover | ................... | A01D 34/18 |
| | | | | | | 56/311 |
| 49,713 | A | * | 9/1865 | Bush | ...................... | A01D 34/18 |
| | | | | | | 56/311 |
| 5,979,152 | A | * | 11/1999 | McCredie | .............. | A01D 34/16 |
| | | | | | | 56/298 |

(Continued)

FOREIGN PATENT DOCUMENTS

BR    1020 1203 2865 A2    8/2014
BR    102012032863 A2    8/2014

(Continued)

OTHER PUBLICATIONS

UK Intellectual Property Office, Search Report for Priority UK Application No. GB1714192.0, dated Mar. 6, 2018.

(Continued)

*Primary Examiner* — Abigail A Risic

(57) ABSTRACT

A sickle guard counter-knife insert includes a pair of counter-knives. Each counter-knife defines a channel for an operable sickle bar between mutually-coupled upper and lower portions. The counter-knives and a connecting crossbar are formed together as an integral unit.

20 Claims, 3 Drawing Sheets

(56) References Cited

U.S. PATENT DOCUMENTS

| | | | | |
|---|---|---|---|---|
| 2002/0005035 A1* | 1/2002 | Hovsepian | ............. | A01D 34/18 |
| | | | | 56/298 |
| 2015/0163995 A1* | 6/2015 | Talbot | ................... | A01D 34/18 |
| | | | | 56/298 |
| 2015/0163996 A1* | 6/2015 | Talbot | ................... | A01D 34/18 |
| | | | | 56/298 |
| 2016/0316620 A1* | 11/2016 | Allochis | ................ | A01D 61/02 |
| 2018/0103581 A1* | 4/2018 | Neely | ................... | A01D 34/16 |
| 2020/0163280 A1* | 5/2020 | Figgins | ................. | A01D 61/02 |

FOREIGN PATENT DOCUMENTS

| | | |
|---|---|---|
| DE | 2948634 A1 | 6/1981 |
| EP | 0155134 A2 | 9/1985 |
| GB | 409 044 A | 4/1934 |
| GB | 559 969 A | 3/1944 |
| RO | 122701 B1 | 12/2009 |

OTHER PUBLICATIONS

European Patent Office< International Search Report for related International Application No. PCT/IB2018/056428, dated Dec. 17, 2018.

\* cited by examiner

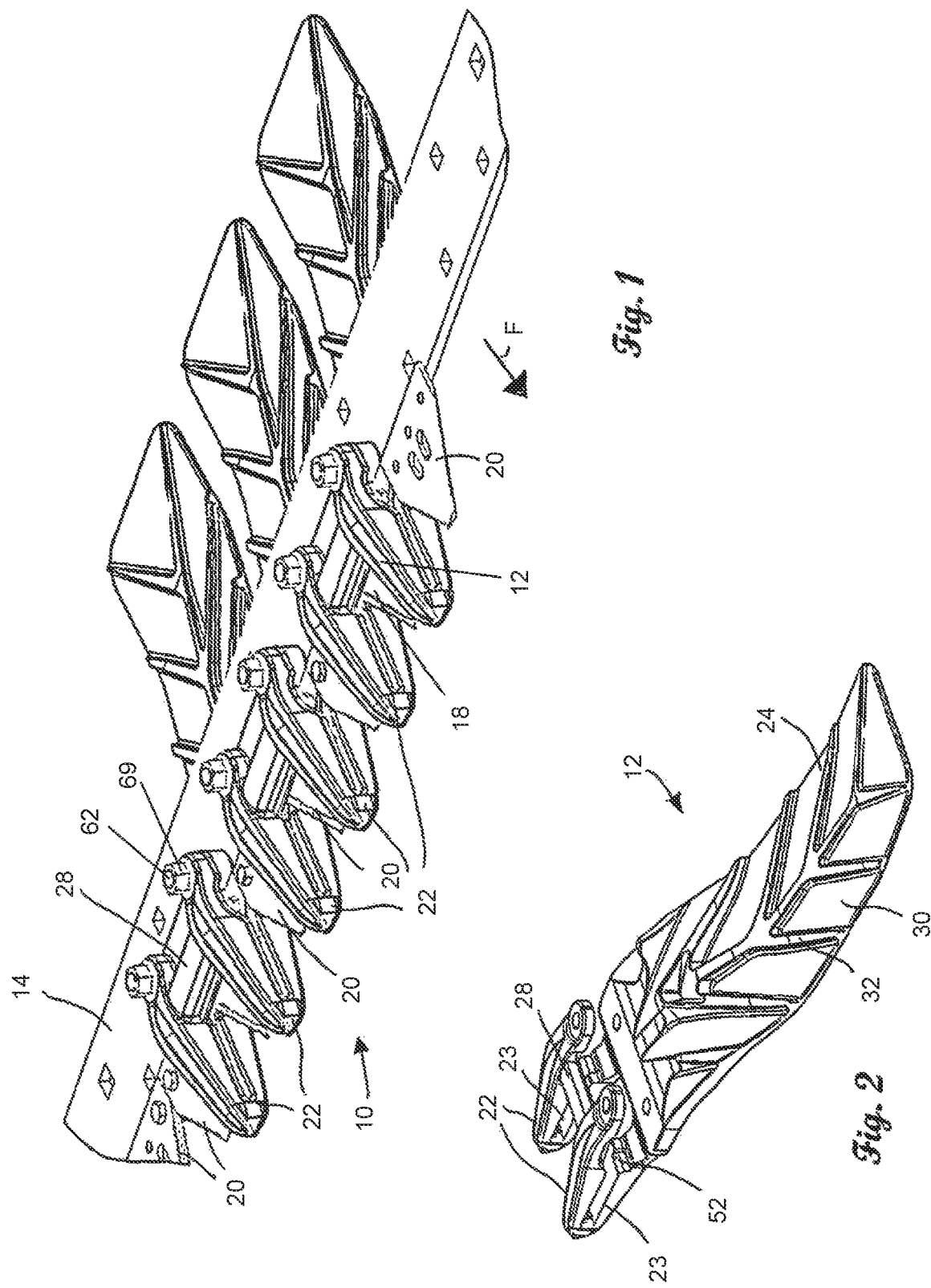

SICKLE GUARD COUNTER-KNIFE INSERT

FIELD

The invention relates to mowing sickles in agricultural harvesting machines including combine harvester headers and mowers. In particular, the invention relates to counter-knives provided in conjunction therewith.

BACKGROUND

Sickle-based cutterbars have been used in agriculture for many decades and typically comprise a plurality of triangular knife sections secured side-by-side along a bar which is driven in reciprocating motion to present a cutting action to standing crops as it progresses in a forward direction. Although more modern agricultural mowers employ disc- or drum-cutting systems, sickle cutterbars are still in common use today in combine harvester headers, especially those for cutting cereal crops.

Cutterbar assemblies are provided with sickle guards for protecting the leading edge of the cutterbar while also serving to hold down and maintain the sickle cutterbar in position as it reciprocates at high speeds. The sickle guards typically include a plurality of forward-projecting fingers each defining an aft-directed recess for receiving the sickle cutterbar.

The knife sections typically have serrated edges which act in conjunction edges of the recesses provided by the guard fingers. Brazil Patent Application BR-10 2012 032865-8 A2 discloses a sickle cutterbar assembly having counter-knife inserts that are secured inside the aft-directed recesses of the guard fingers, the inserts each serving as a counter-knife for cooperating with the knife sections that slideably reciprocate relative thereto during operation.

Advantageously, the counter-knife inserts of Brazil Patent Application BR-10 2012 032865-8 A2 can be replaced when worn without the need to replace the entire sickle guard units. However, the inserts are each secured in place to the associated guard finger by a dedicated screw fixing, which must be countersunk into the insert in order to avoid obstructing the cutterbar. In addition to the downside of significant assembly time, the inserts have been found to work loose over time and suffer from fragility.

SUMMARY

In accordance with a first aspect of the invention, there is provided a sickle guard counter-knife insert comprising a pair of counter-knives, each counter-knife defining a channel for an operable sickle bar between mutually-coupled upper and lower portions, the counter-knives being connected together by a crossbar, wherein the counter-knives and crossbar are formed together as an integral unit. Advantageously, by providing a pair of counter-knives together in an integral unit coupled by a crossbar, the insert can be conveniently secured to the cutterbar assembly using existing bolts utilized to secure the sickle guards in place. Furthermore, the improved fixing method reduces the occurrence of the counter-knives becoming dislodged. As such, the inserts may provide a significant cost reduction and increase in robustness over that disclosed by Brazil Patent Application BR-10 2012 032865-8 A2, for example.

The inserts preferably comprise sharpened lateral edges to cooperate with the sharp cutting edges of the knife sections.

The upper and lower portions are preferably connected by a weakened and bent connecting region. The integral unit can be conveniently fabricated by, for example, simply cutting from sheet metal. For example the inserts, including the weakened region, may be cut from sheet metal by laser-cutting, water-jet cutting or stamping, and then bent to shape to form the channel. Each counter-knife may be bent, for example, so as to define a generally C-shaped channel.

Preferably, the integral unit further comprises a pair of tabs, each tab being longitudinally aligned with a respective one of the counter-knives and comprising a hole for receiving a securing bolt. The securing bolt may also conveniently secure the associated sickle guard unit to a header.

The counter-knife inserts may be provided in a cutterbar assembly which also comprises a sickle cutterbar and a sickle guard comprising a plurality of forward-projecting guard fingers, each defining an aft-directed recess. The counter-knife inserts are inserted into, and secured to, respective adjacent pairs of the recesses, and the sickle cutterbar is operably driven in reciprocating motion inside the channels.

In an embodiment, the sickle guard is formed from polymeric material, and the counter-knife inserts are metallic. Advantageously, the polymeric sickle guard delivers a cost and weight reduction over metal equivalents, whereas the counter-knife inserts remain hard enough to serve their required function with an acceptable lifetime.

The sickle guard may include a plurality of sickle guard units each having a pair of said guard fingers. Each of the guard fingers may then be connected in an upper region to an adjacent guard finger by a crosslink that mates with the crossbar of one of the inserts, thus delivering a robust construction in which the guard fingers are laterally tied and do not shift.

In another embodiment, each sickle guard unit is integral with a skid that projects rearward of the sickle cutterbar. The integrated skid and sickle guard unit delivers a beneficial reduction in component count and thus cost and assembly time.

In another embodiment, a sickle guard unit for a cutterbar assembly includes a plurality of forward-projecting guard fingers each defining an aft-directed recess for receiving a sickle cutterbar, and a skid for engaging the ground during use. The guard fingers and skid are formed together as an integral unit.

BRIEF DESCRIPTION OF THE DRAWINGS

Further advantages will become apparent from reading the following description of specific embodiments of the invention with reference to the appended drawings in which:

FIG. 1 is a perspective view of part of a cutterbar assembly of a harvester header;

FIG. 2 is a perspective view of a sickle guard unit of the assembly of FIG. 1 but shown in isolation;

DETAILED DESCRIPTION

Figure 3:
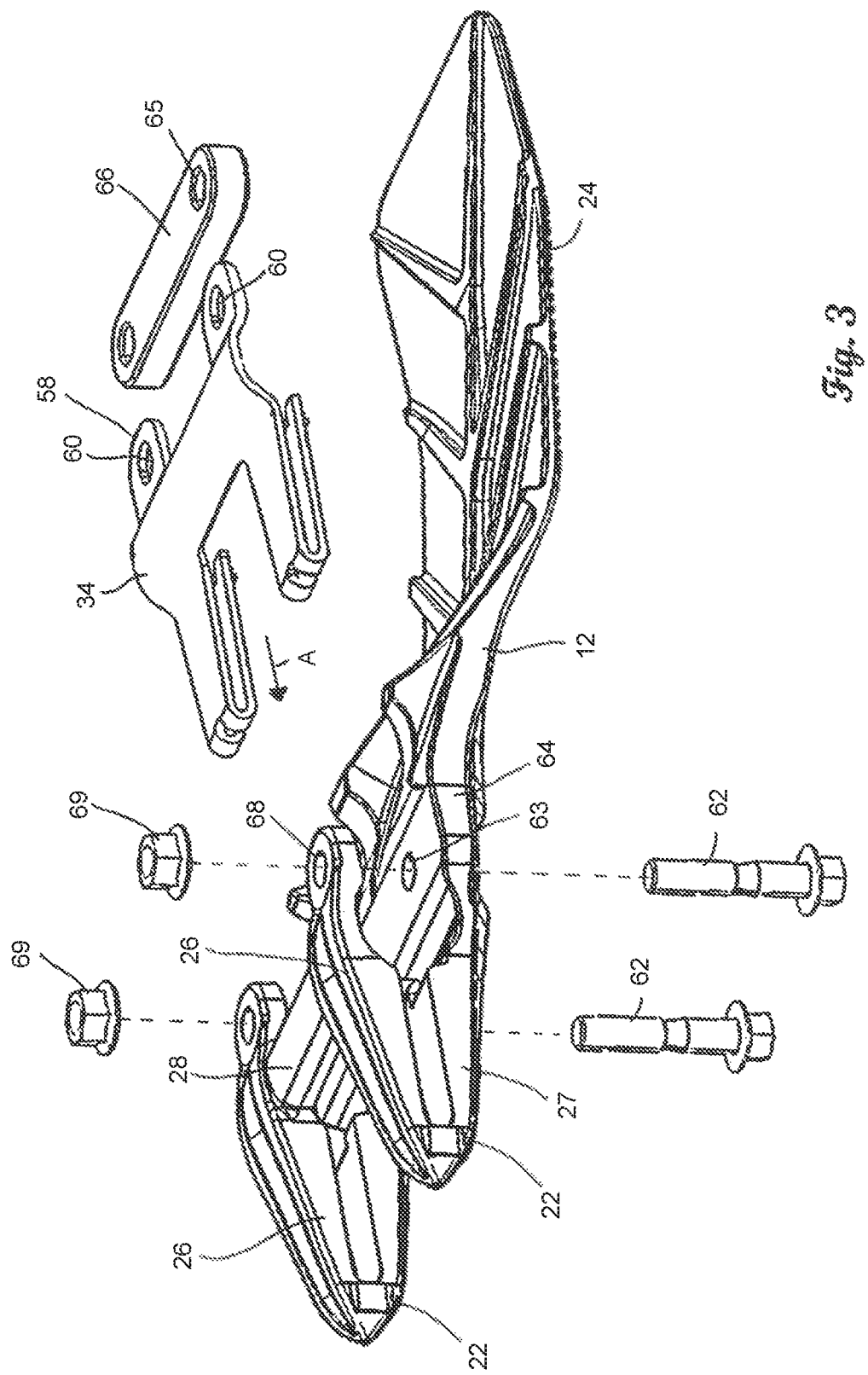
FIG. 3 is an exploded perspective view of a sickle guard unit and counter-knife insert from the assembly of FIG. 1.

Example embodiments will now be described with references throughout the section to alternative constructions and arrangements, which are given by way of example only.

Although the following description focuses on implementation in agricultural machines, the disclosure is not limited to such.

With reference to FIG. 1, a harvester header comprises a cutterbar assembly 10 which a plurality of sickle guard units 12 secured in a side-by-side spaced relationship to a frame member 14, which forms part of an overall header frame. FIG. 2 shows a single guard unit 12 in more detail. It should be appreciated that only part of the assembly 10 is shown and that the header may have an overall working width extending up to 15 meters for example. Moreover, other parts of the header, such as conveyors, a reel, the drive apparatus, are omitted from the figures and are not essential to an understanding of the invention.

The frame member 14 extends transverse to a normal forward direction of operation as indicated by arrow 'F', and is formed of an elongate flat metal bar. The guard units 12 are secured to the frame member by bolts 62 and nuts 69 and will be described in more detail below. The assembly 10 also includes a sickle cutterbar 18 having a known construction with a plurality of triangular knife sections 20 bolted or riveted to a supporting bar (not shown). The cutterbar 18 is driven by a drive mechanism (not shown) in an oscillating motion during operation to deliver a cutting action in a known manner.

Each guard unit 12 comprises a pair of forward-projecting fingers 22, each defining an aft-directed recess 23 for receiving the sickle cutterbar 18. A skid 24 is integrated with each pair of fingers 22, the skid serving to engage the ground during use and maintain at least a minimum ground clearance to protect the cutterbar 18. The skid 24 projects rearward and downward of the sickle cutterbar 18.

The guard units 12 are formed by an injection molding process, although other molding techniques may also be used. The material is a polymeric material, such as polyacrylamide with a 50% glass fiber content. Optionally, additives may be added to the material during fabrication to tailor the material properties. For example, an additive may be used to strengthen the material. The skid 24 is light and resilient, and is integrated into the guard unit 12, therefore avoiding the need for dedicated bolts and delivering a reduction in assembly time.

Figure 4:
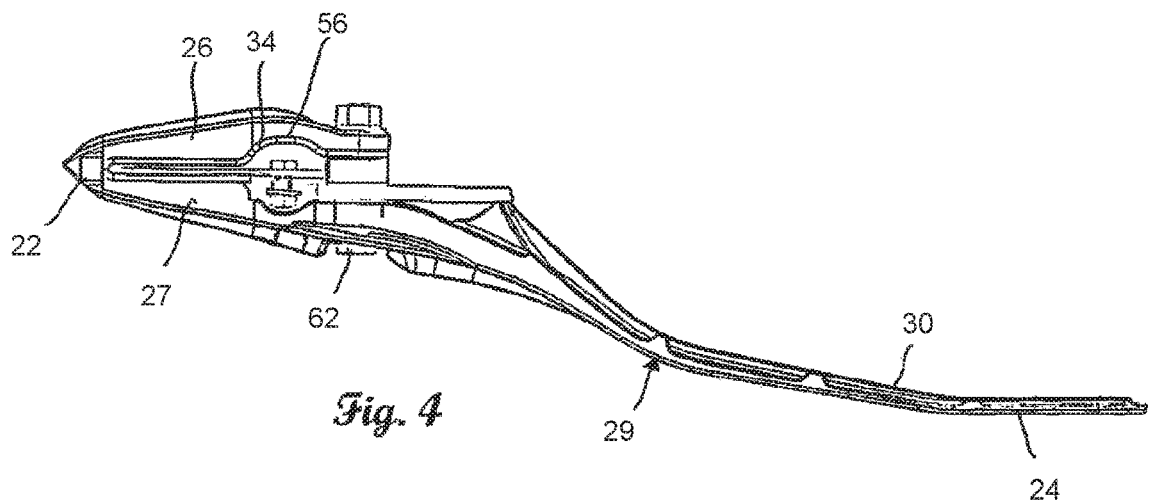
FIG. 4 is a side view of the sickle guard unit and counter-knife insert, together with the sickle cutterbar of the assembly of FIG. 1.

With reference also to FIGS. 3 and 4, each guard finger 22 comprises an upper portion 26 and a lower portion 27 defining the recess 23 therebetween. The adjacent pair of guard fingers 22 provided on each guard unit 12 are connected by a crosslink 28 connected (and integrated therewith) to the respective upper portions 26. The crosslink 28 delivers rigidity to the structure of the guard unit 12 and maintains a constant separation between the guard fingers 22.

The skids 24 each comprise a smooth underside 29 and a ribbed topside 30, the latter in the illustrated example having ribs 32 formed in a herringbone pattern. The ribs 32 serve to provide a robust yet flexible and light structure. The herringbone pattern serves additionally to provide a self-cleaning function wherein any sticky material, soil for example, is removed by frictional forces from contact with the ground.

Figure 5:
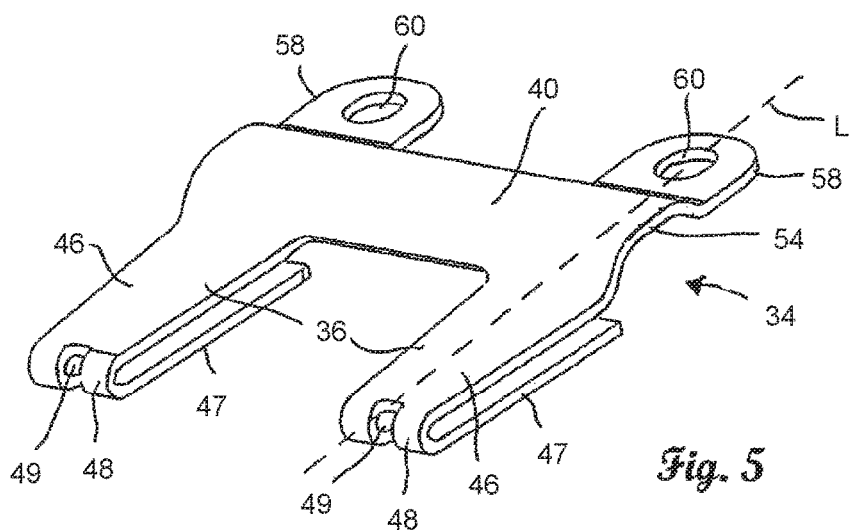
FIG. 5 is a perspective view of one counter-knife insert from the assembly of FIG. 1; and, FIG. 6, is a side view of the insert of FIG. 5.
Figure 6:
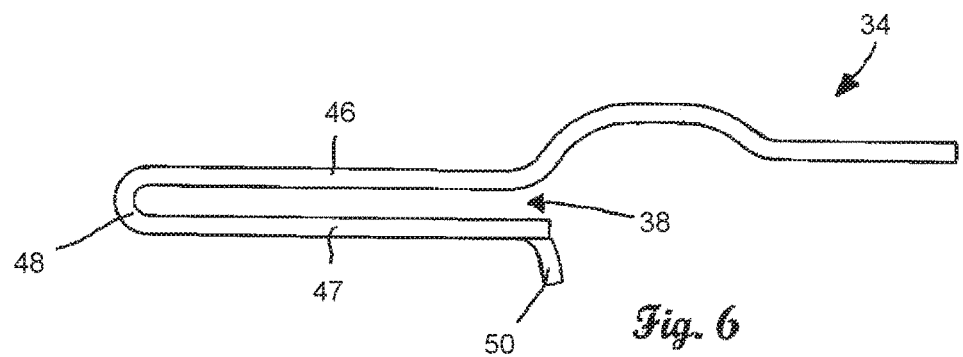

In some embodiments, each guard unit 12 is provided with a counter-knife insert 34 shown in place in FIG. 4 and in isolation in FIGS. 3, 5 and 6. Each insert 34 comprises a pair of counter-knives 36, each defining a channel 38 which resides inside the aft-directed recess 23 provided by the guard fingers 22. The counter-knives 36 are connected together by a crossbar 40.

It should be appreciated that each of the plurality of guard units 12 is provided with an insert 34 as described, each insert 34 being identical to the others. The design and function of the inserts 34 will be described below with reference to the singular only.

The insert 34 comprises an upper portion 46 and a lower portion 47 connected by a connecting region 48. The insert 34 is fabricated from a single sheet of metal, steel for example, wherein a flat pattern is stamped, or cut, and bent into the required shape. The connecting region 48 may be weakened by the provision of one or more holes 49 which allows the flat pattern to be bent into shape more easily with the upper and lower portions 46 47. The elasticity of the connecting region 48 is preferably such that, when inserted into the guard finger recess 23, a tight press-fit is achieved. The holes 49 may optionally engage with protruding stubs (not shown) inside the recesses 23 to provide additional lateral fixation. Each counter-knife 36 therefore includes the upper portion 46, lower portion 47 and the connecting region 48 together presenting a generally C-shaped side profile when viewed along the direction of the cutterbar 18 (i.e., as in FIG. 6).

Each lower portion 47 includes at an aft edge a retaining tab 50 which is bent downward to abut a rear shelf 52 (FIG. 2) of the recess 23 when in position.

Each insert 34 is bent to define a transverse ridge 54 parallel to the cutterbar 18 and extends along the crossbar 40. The ridge 54 mates with a corresponding concave portion 56 in the underside of the upper portion 26 of each guard finger 22 and in the underside of crosslink 28. Extending rearward of the ridge 54 are a pair of securing tabs 58 which are each longitudinally aligned with a respective one of the counter-knives 36, the longitudinal direction being illustrated by dashed line 'L' in FIG. 5. Each securing tab 58 is provided with a respective hole 60.

With particular reference to FIG. 3, during assembly, the insert 34 is inserted into the recesses 23 of the guard unit 12 in the direction of arrow 'A' so that each counter-knife 36 engages into a respective one thereof and the retaining tabs 50 abut against the respective shelves 52. The insert 34 is secured into position by two bolts 62 that each pass through a respective lower hole 63 provided in the base 64 of guard unit 12, a respective hole 65 provided in a transverse spacer 66, a respective one of holes 60 provided in securing tabs 58 and a respective upper hole 68 provided in the upper portion 26 of the associated guard finger 22. Each bolt is secured and tightened by a respective nut 69.

The sickle cutterbar 18 is retained in the channels 38 of the counter-knives 36 and slideably reciprocates when in operation. The lateral edges of the counter-knives 36 are preferably sharpened so as to act in cooperation the reciprocating knife sections 20 to deliver a cutting action. In one embodiment, the lateral edges of both the upper and lower portions 46 47 are sharpened. Alternatively, the lateral edges of only one of the upper and lower portions 46 47 are sharpened.

Each insert 34 is formed as a unitary component wherein the counter-knives 36 and crossbar 40 are formed together as an integral unit. In an embodiment, the inserts 34 are formed from a hard, rigid material such as mild steel, or hardened steel, and the guard units 12 are formed from polymeric material. Advantageously, this combination allows for a light, yet robust, construction wherein the counter-knives 36 can be simply replaced at low cost when worn without having to replace the guard units 12.

In summary therefore, a sickle guard counter-knife insert may be simpler and cheaper to fabricate, assemble and replace than existing counter-knife inserts, offering a robust construction that resists the forces presented by cutterbar oscillating therein. Moreover, a sickle guard unit formed integrally with a ground-engaging skid may deliver both cost and weight benefits over known assemblies.

It should be emphasized that the above-described embodiment of the present disclosure is merely a possible example of implementation, merely set forth for a clear understanding of the principles of the disclosure. Many variations and modifications may be made to the above-described embodiment of the disclosure without departing substantially from the spirit and principles of the disclosure.

The invention claimed is:

1. A sickle guard counter-knife insert, the insert comprising:
   a pair of counter-knives, each counter-knife defining a channel for an operable sickle bar between mutually coupled upper and lower portions of each counter-knife; and
   a crossbar connecting the pair of counter-knives, wherein the counter-knives and crossbar are formed together as an integral unit.

2. The insert of claim 1, wherein each counter-knife comprises sharpened lateral edges.

3. The insert of claim 2, wherein both the upper and lower portions comprise sharpened edges.

4. The insert of claim 1, wherein the upper and lower portions are connected by a weakened and bent connecting region.

5. The insert of claim 1, wherein each counter-knife is generally C-shaped.

6. The insert of claim 1, wherein the integral unit further comprises a pair of tabs, wherein each tab is longitudinally aligned with a respective one of the counter-knives and defines a hole for receiving a securing bolt.

7. A cutterbar assembly comprising comprising:
   a sickle cutterbar;
   a sickle guard comprising a plurality of forwardly projecting guard fingers each defining an aft-directed recess; and
   a plurality of counter-knife inserts, each insert comprising:
   a pair of counter-knives, each counter-knife defining a channel for the sickle cutterbar between mutually coupled upper and lower portions of each counter-knife; and
   a crossbar connecting the pair of counter-knives, wherein the counter-knives and crossbar are formed together as an integral unit, wherein each insert is inserted into, and secured to, an adjacent pair of recesses of the sickle guard such that the sickle cutterbar may be operably driven in reciprocating motion inside the channels of the counter-knives.

8. The cutterbar assembly of claim 7, wherein the sickle guard comprises a polymeric material, and wherein the counter-knife inserts comprise metal.

9. The cutterbar assembly of claim 7, wherein the sickle guard comprises a plurality of sickle guard units, each unit having a pair of the guard fingers.

10. The cutterbar assembly of claim 9, wherein each pair of the guard fingers are connected in an upper region by a crosslink mated with the crossbar of one of the inserts.

11. The cutterbar assembly of claim 9, wherein each sickle guard unit is integral with a skid that projects rearward of the sickle cutterbar.

12. The cutterbar assembly of claim 11, wherein the skid exhibits a smooth underside and a ribbed topside.

13. The cutterbar assembly of claim 9, wherein the sickle cutterbar comprises a plurality of knife sections configured to be driven in an oscillating motion, wherein each pair of counter-knives comprises sharpened lateral edges, and wherein each knife section of the sickle cutterbar passes a lateral edge of a counter-knife as the sickle cutterbar oscillates.

14. The cutterbar assembly of claim 13, wherein each knife section of the sickle cutterbar passes between a lateral edge of the upper portion of a counter-knife and a lateral edge of the lower portion of the counter-knife.

15. A method comprising:
   forming an integral unit comprising a sickle guard counter-knife insert, the integral unit comprising:
   a pair of counter-knives, each counter-knife defining a channel for an operable sickle bar between mutually coupled upper and lower portions of each counter-knife; and
   a crossbar connecting the pair of counter-knives.

16. The method of claim 15, further comprising sharpening lateral edges of each of the counter-knives.

17. The method of claim 15, wherein forming an integral unit comprises:
   cutting sheet metal; and
   bending the cut sheet metal to form a shape of the counter-knives and the crossbar.

18. The method of claim 17, wherein cutting sheet metal comprises a method selected from the group consisting of laser-cutting, water-jet cutting, and stamping.

19. The method of claim 17, wherein cutting sheet metal comprises forming at least one hole in the sheet metal to facilitate bending the cut sheet metal.

20. The method of claim 15, further comprising inserting the integral unit into a sickle guard comprising a plurality of forwardly projecting guard fingers each defining an aft-directed recess.

* * * * *